US010151494B2

(12) United States Patent
Beifuss et al.

(10) Patent No.: US 10,151,494 B2
(45) Date of Patent: Dec. 11, 2018

(54) HOB AND METHOD FOR CONTROLLING A HOB

(71) Applicant: BSH Bosch und Siemens Hausgeräte GmbH, Munich (DE)

(72) Inventors: Wolfgang Beifuss, Chieming (DE); Uwe Has, Unterneukirchen (DE); Matthias Jahner, Waging am See (DE)

(73) Assignee: BSH Hausgeräte GmbH, Munich (DE)

( * ) Notice: Subject to any disclaimer, the term of this patent is extended or adjusted under 35 U.S.C. 154(b) by 365 days.

(21) Appl. No.: 14/386,006

(22) PCT Filed: Apr. 2, 2013

(86) PCT No.: PCT/EP2013/056913
§ 371 (c)(1),
(2) Date: Sep. 18, 2014

(87) PCT Pub. No.: WO2013/150014
PCT Pub. Date: Oct. 10, 2013

(65) Prior Publication Data

US 2015/0042453 A1 Feb. 12, 2015

(30) Foreign Application Priority Data

Apr. 5, 2012 (DE) ........................ 10 2012 205 621

(51) Int. Cl.
*G05B 19/00* (2006.01)
*F24C 7/08* (2006.01)
*G08C 17/02* (2006.01)

(52) U.S. Cl.
CPC .............. *F24C 7/087* (2013.01); *F24C 7/082* (2013.01); *G08C 17/02* (2013.01); *G08C 2201/93* (2013.01)

(58) Field of Classification Search
CPC .......... F24C 7/087; F24C 7/082; G08C 17/02; G08C 2201/93
USPC ........................................................ 340/5.64
See application file for complete search history.

(56) References Cited

U.S. PATENT DOCUMENTS 6,198,079 B1 3/2001 Essig
6,611,914 B1 * 8/2003 Lee ........................ G06F 21/34 709/223
8,310,367 B1 * 11/2012 Vishwanath ....... G06K 19/0773 340/572.1

(Continued)

FOREIGN PATENT DOCUMENTS

| | | | |
|---|---|---|---|
| DE | 202011050585 | U1 | 10/2011 |
| EP | 2385311 | A2 | 11/2011 |
| SE | 1100399 | A1 | 1/2012 |
| WO | 2012019886 | A2 | 2/2012 |

OTHER PUBLICATIONS

International Search Report PCT/EP2013/056913 dated Jun. 19, 2013.
National Search Report DE 10 2012 205 621.1 dated Dec. 20, 2012.

*Primary Examiner* — Zhen Y Wu

(74) *Attorney, Agent, or Firm* — Michael E. Tschupp; Andre Pallapies; Brandon G. Braun

(57) ABSTRACT

A hob has a first communications interface which is designed to receive control commands from a portable multimedia device by means of a first radio link. The hob additionally has a second communications interface, which is designed to communicate with the multimedia device via a second radio link.

18 Claims, 3 Drawing Sheets

(56) References Cited

U.S. PATENT DOCUMENTS

| | | | | |
|---|---|---|---|---|
| 2004/0172396 | A1* | 9/2004 | Vanska | G07C 9/00309 |
| 2005/0257411 | A1* | 11/2005 | Wootton | F41A 17/063<br>42/70.01 |
| 2007/0074714 | A1* | 4/2007 | Rieser | F24C 3/126<br>126/39 E |
| 2007/0125363 | A1* | 6/2007 | Gassler | F24C 7/083<br>126/273 R |
| 2008/0088407 | A1* | 4/2008 | Hamm | G01D 3/08<br>338/171 |
| 2008/0205354 | A1 | 8/2008 | Makela et al. | |
| 2008/0272930 | A1* | 11/2008 | Morillas Bueno | G08C 17/02<br>340/13.24 |
| 2009/0294436 | A1* | 12/2009 | Roth | H05B 6/1209<br>219/622 |
| 2011/0146649 | A1* | 6/2011 | Brenner | F23N 1/002<br>126/42 |
| 2011/0312272 | A1* | 12/2011 | Goto | G08C 17/02<br>455/41.1 |
| 2012/0167869 | A1* | 7/2012 | Huang | F24C 3/00<br>126/39 BA |
| 2012/0280801 | A1* | 11/2012 | Muratsu | G08C 17/00<br>340/12.5 |
| 2013/0176116 | A1* | 7/2013 | Jung | G08O 17/02<br>340/12.5 |
| 2014/0176315 | A1* | 6/2014 | Moore | G08C 17/02<br>340/12.52 |

* cited by examiner

HOB AND METHOD FOR CONTROLLING A HOB

BACKGROUND OF THE INVENTION

The present invention relates to a hob according to the precharacterizing clause of the first independent claim, and a method for controlling a hob according to the precharacterizing clause of the second independent claim.

From WO 2012/019886 A2 a domestic appliance is known for preparing food, having a communications interface. This enables wireless communication with a unit that is external to the domestic appliance. The communications interface is designed as a short-range communications interface for radio signals.

BRIEF SUMMARY OF THE INVENTION

The object of the invention is to improve the cited prior art.

According to the characterizing part of claim 1 the hob has a second communications interface, which is designed to communicate with the multimedia device via a second radio link. The two radio links are here designed differently from one another, in that they for example operate in different frequency bands and/or use different transmission protocols. By using a portable multimedia device, for example a smartphone or a tablet PC, convenient operation of the hob using e.g. large touch keys and/or a high-resolution color screen is achieved. Moreover, using two radio links independent of one another enables safe operation. This is particularly the case if one radio link is used to transmit the control commands and the other radio link to confirm that a user of the multimedia device is located in the vicinity of the hob. The transmission of the control commands can take place here for example via standardized radio networks, e.g. Zig Bee, Z-Wave, Bluetooth or WLAN.

In a preferred embodiment the first communications interface is designed to receive control commands via a wireless network, in particular a WLAN network. This uses a technology which is already available in many households, and thus represents a low-cost transmission method from the multimedia device to the hob. The exchange of data between the hob and the multimedia device via the first radio link is preferably designed to be bidirectional, so that the multimedia device can not only send control commands but also receive data from the hob. Thus for example the hob with individual heating zones can be graphically displayed on the multimedia device, with set heat outputs assigned to the heating zones being displayed. Likewise, additional values, e.g. remaining cooking times, current temperatures or energy consumption, can be displayed in a graphically appealing way.

In another embodiment it is proposed that the second communications interface is designed to communicate over a maximum distance of 30 cm, in particular of 15 cm. This permits very safe operation of the hob by radio transmission, since the short range of the second radio link ensures that in the case of a successful data transmission via this radio link a user of the hob is located in its immediate vicinity. Particularly safe, supervised operation in the visual range of the hob is thus ensured. In the case of larger ranges, e.g. using a Bluetooth connection, a user of the hob could be located outside the visual range of the hob (e.g. behind a wall) and nevertheless control the hob. This would not ensure safe operation, especially since the user could theoretically activate the hob by accident, without being aware of it.

Furthermore, the invention relates to a method for controlling the hob according to the characterizing part of claim 4, whereby before the transmission of the control commands and/or before implementation of the control commands in the hob, authorization for this is necessary, and is obtained via a second radio link between the multimedia device and the hob. A corresponding connection setup via the second radio link to the authorization can here be initiated from the hob or from the multimedia device. Using a method of this type it can be ensured that despite the control commands being transmitted to the hob using radio signals only supervised operation in the visual range of the hob takes place. This rules out any danger in respect of uncontrolled or unintended operation. This is particularly achieved by limiting the range of the second radio link for obtaining the authorization. Such a range can for example be less than 30 cm, in particular less than 15 cm. The two radio links here differ in the frequency band used and/or in the use of different transmission protocols. This ensures that any operation of the hob by the multimedia device is done consciously.

Preferably any authorization given remains valid for a limited period, even if no more signals are transmitted via the second radio link. A valid authorization can in this case be saved in the hob and/or in the multimedia device. Operation of the hob by a user becomes more convenient thanks to the longer validity of the authorization, as the user initially brings the portable multimedia device near to the hob to obtain an authorization, but can then move away from the hob again to input the control commands. The control commands can hence be input from a location from where e.g. the display of the multimedia device is more easily readable, or which is further away from the hot cooking vapors of the hob. Nevertheless the hob is being operated consciously, since a user of the hob must initially be in its vicinity.

It is preferable if the length of time is limited to a value of less than 5 minutes, in particular less than 3 minutes. On the one hand this means that there is enough time to input control commands and to transmit them to the hob, and on the other hand prevents a user of the hob from being too far away from it.

It may be advantageous if the control commands can be transmitted to the hob without prior authorization and are saved there until an authorization is given, or until they are deleted. For example, control commands can be transmitted to the hob via a WLAN connection from a larger distance, e.g. via a smartphone or a tablet PC. The control commands are not implemented in the hob until an authorization for this is given via the second radio link. For the authorization it is necessary for the multimedia device to be located near to, or in visual range of, the hob. In contrast, to input or transmit the control commands using a multimedia device it is not necessary for a user of the hob to be located in its immediate vicinity.

If the authorization is given by exchanging data via an NFC radio link, this ensures that the authorization is given only in the near-field of the hob. The abbreviation NFC (Near-Field Communication) here refers to an international transmission standard for the contactless exchange of data over short links.

Because active RFID (radio frequency identification) technology is used for the NFC radio link, particularly in the frequency range of 13.5 MHz, a particularly safe authorization procedure is possible. Active RFID technology here means bidirectional data transmission by means of an active transponder (with its own power supply) and a read device, in which both devices can actively transmit.

According to another development of the invention at least some of the control commands are generated by a user of the hob indirectly by using the multimedia device to select a dish to be cooked. A user of the hob for example selects a dish to be cooked from a list, following which the occupancy of different heating zones of the hob with suitable cooking vessels, together with their contents, is displayed or listed for the user. The corresponding control commands for the different heating zones, together with their operating modes, are transmitted together via the first radio link. A digital cookbook can thus for example be furnished with corresponding control data for the hob.

BRIEF DESCRIPTION OF THE DRAWINGS

Other features and advantages of the invention emerge from the following description of two exemplary embodiments, with reference to the appended figures, in which.

DETAILED DESCRIPTION OF EXEMPLARY EMBODIMENTS OF THE PRESENT INVENTION

Figure 1:
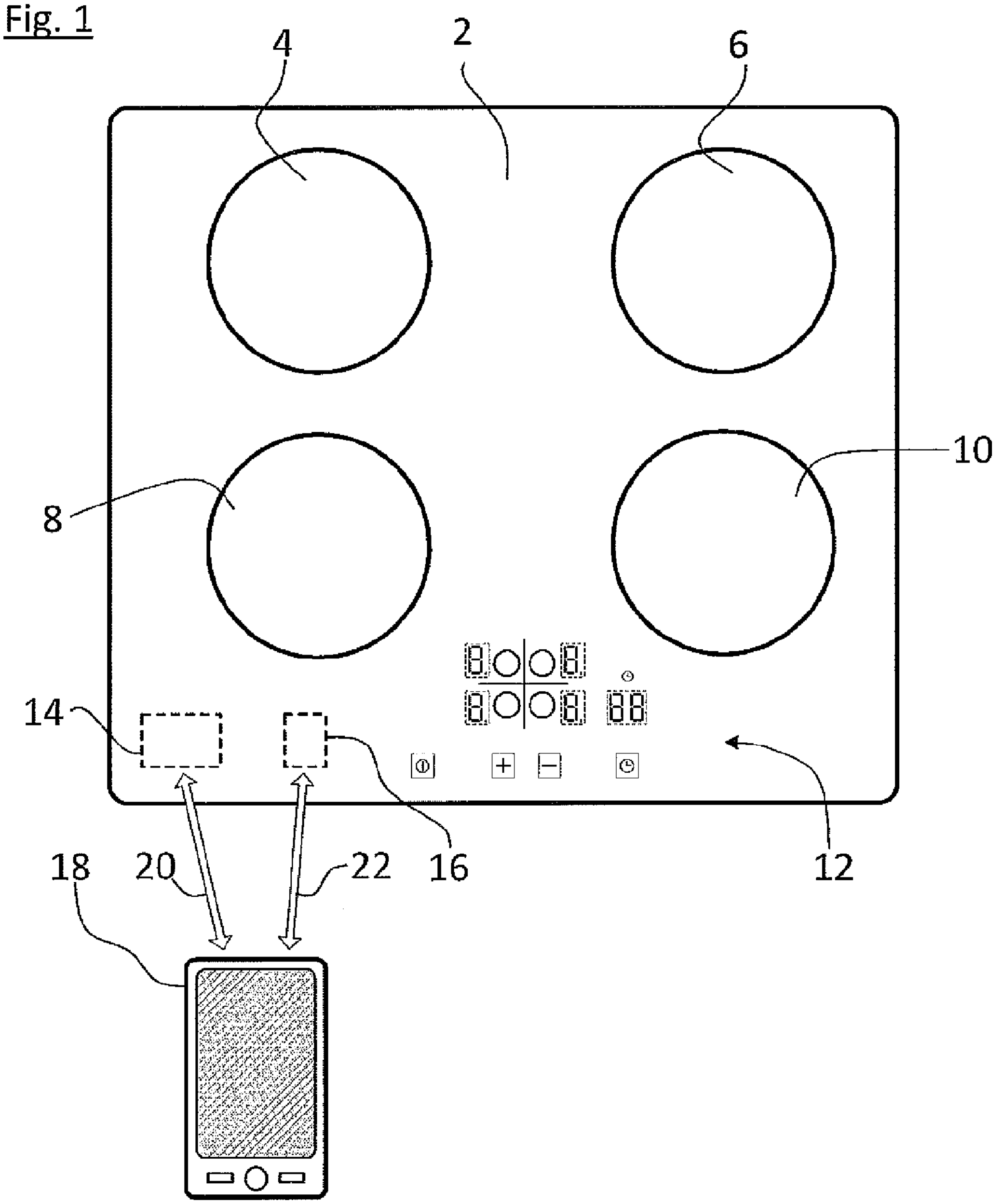
FIG. 1 shows a hob with a multimedia device.

A hob with a glass ceramic plate 2 on which four heating zones 4, 6, 8, 10 are arranged is shown in FIG. 1. The hob further has an operating unit 12, by means of which the hob can be controlled via touch sensor keys, as well as digital displays operatively connected thereto. In addition, the hob has a first communications interface 14 and a second communications interface 16, independent of the first, each of which are arranged under the glass ceramic plate 2. The two communications interfaces 14, 16 are each designed to communicate with a multimedia device 18. In this case the first communications interface 14 communicates via a first radio link 20 with the multimedia device 18. Accordingly the second communications interface 16 communicates via a second radio link 22 with the multimedia device 18. The first radio link 20 is designed as a WLAN or WIFI wireless network. The second radio link 22 is designed as an NFC radio link and works in the frequency range of 13.5 MHz using active RFID technology. Whereas the range of the first radio link can certainly be up to 100 m, the range of the second radio link is only up to 10 cm. The multimedia device 18 is designed as a smartphone and has a program for generating control data for the hob.

Figure 2:
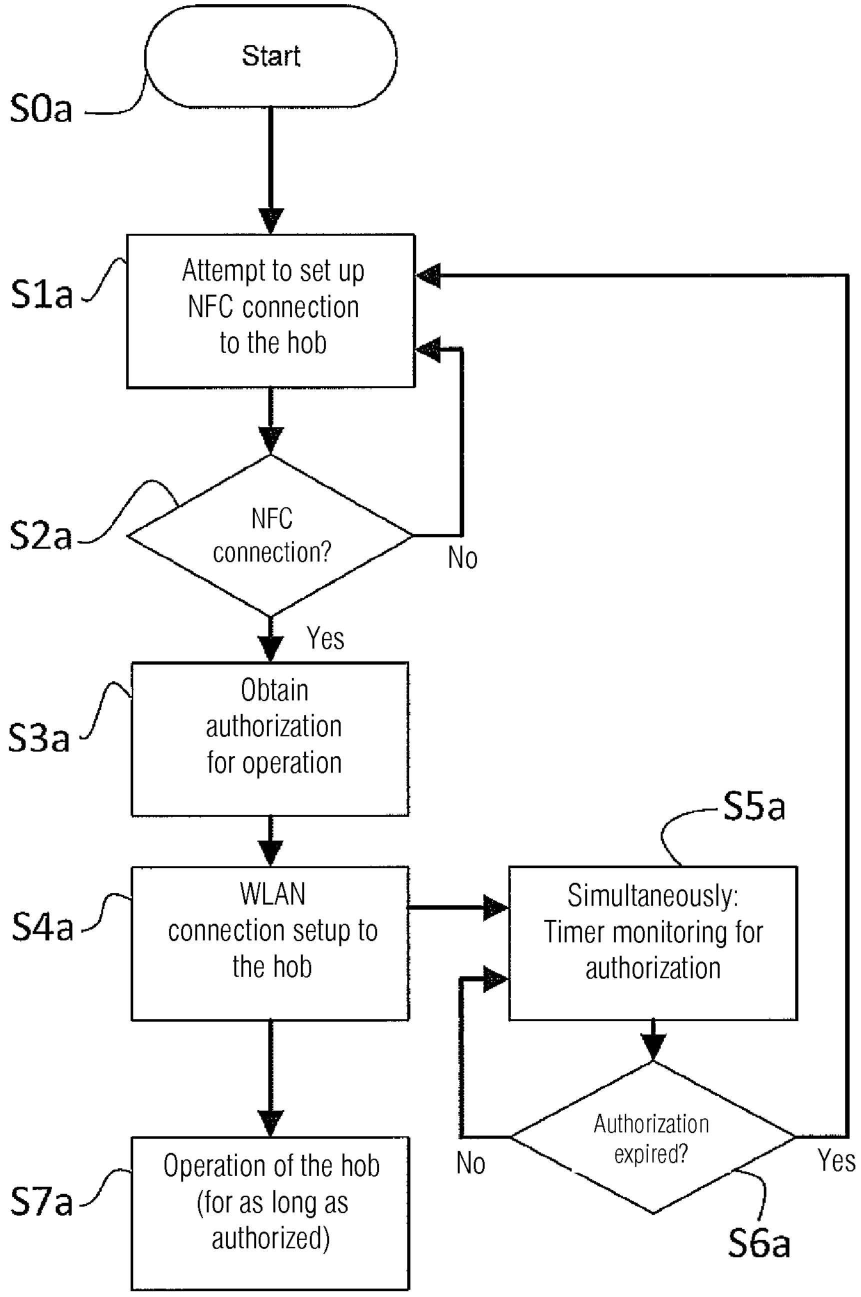
FIG. 2 shows a program sequence according to a first exemplary embodiment and FIG. 3 shows a program sequence according to a second exemplary embodiment.

A flow chart for controlling the hob using the smartphone 18 is illustrated in a first exemplary embodiment in accordance with FIG. 2. After the control commands have been directly or indirectly input into the smartphone 18 by a user of the hob the transmission of the control commands is initiated with the sequence step S0*a*. Direct input here means for example the concrete input of the power setting of one of the heating zones 4, 6, 8, 10. Indirect input means for example the input of the control commands by selecting a dish to be cooked or by selecting an automatic program for one or more of the heating zones 4, 6, 8, 10. Then in sequence step S1*a* the smartphone 18 attempts to set up an NFC connection to the hob via the second radio link 22. If the connection setup is unsuccessful the program in sequence step S2*a* branches back to sequence step S1*a*. A new connection setup is attempted. If the NFC connection setup in accordance with sequence step S2*a* is successful, then in sequence step S3*a* the smartphone 18 obtains an authorization to transmit the control data to the hob. Subsequently the multimedia device in sequence step S4*a* sets up a WLAN connection to the hob. At the same time, in sequence step S5*a*, a timer for limiting the duration of the authorization is started. Sequence step S6*a* checks the validity of the authorization and if the program identifies an expired authorization it returns to sequence step S1*a*. If the authorization has not expired, a user of the hob can, in accordance with sequence step S7*a*, operate the hob via the smartphone 18, the latter being able to send control commands to the hob during the period of the authorization, which are then immediately implemented. In this first exemplary embodiment it is possible to operate the hob directly using the smartphone 18, for as long as an authorization for it exists or for as long as the smartphone 18 is within the NFC range.

Figure 3:
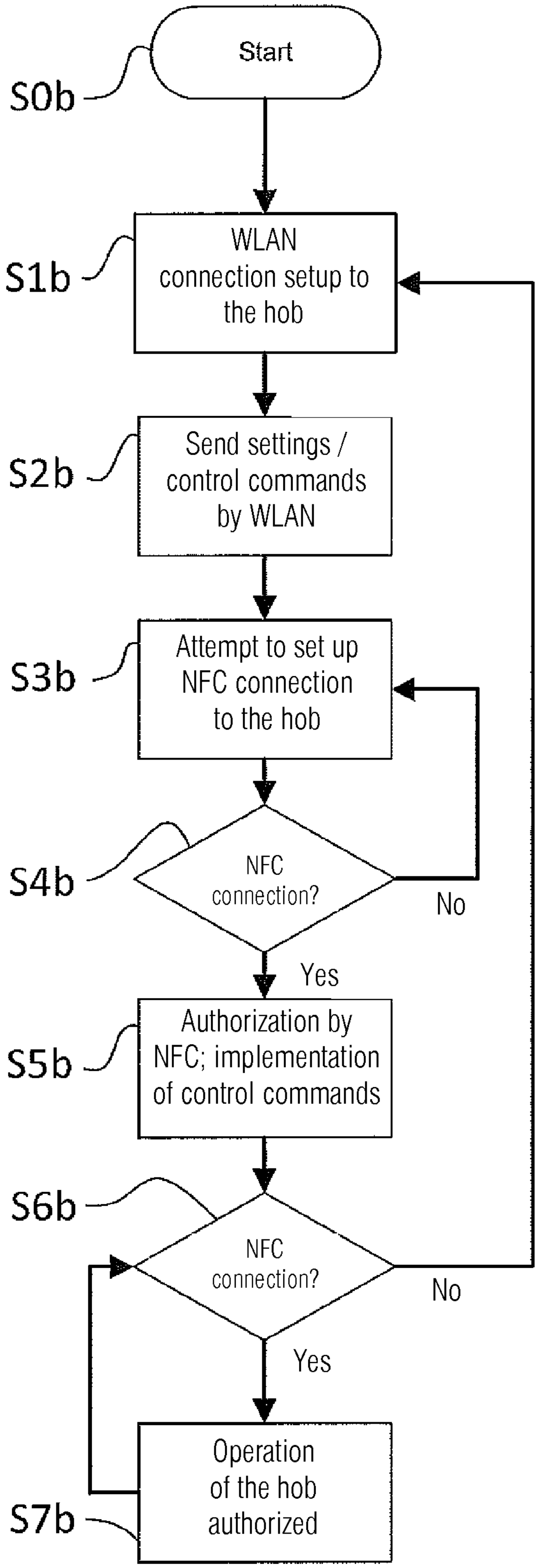

The flow chart of a second exemplary embodiment is illustrated in FIG. 3. Following a program start in sequence step S0*b* the smartphone 18 sets up a WLAN connection to the hob in the sequence step S1*b*. In the following sequence step S2*b* the settings made on the smartphone 18, or the corresponding control commands, are sent to the hob. Then follows sequence step S3*b*, in which the smartphone 18 attempts to set up an NFC radio connection to the hob, in order to authorize the transmitted control commands. In sequence step S4*b* it is checked whether an NFC connection is in place. If it is, then in sequence step S5*b* the inputs made at the smartphone 18 or the control commands are confirmed by NFC connection, or are authorized and their implementation in the hob is initiated. If no NFC connection can be established in sequence step S4*b*, the program jumps back to sequence step S3*b*. After the inputs or the control commands have been authorized in sequence step S5*b*, a check is made in sequence step S6*b* to see whether the NFC connection still exists. If it does not, the program is continued with sequence step S1*b*. If an NFC connection still exists, the program continues with sequence step S7*b*, with the hob being operated directly via the smartphone 18.

The invention claimed is:

1. A hob, comprising:

one or more heating zones;

first communications interface configured to receive a control command via a first radio link using a portable multimedia device, wherein the control command is operable to adjust the one or more heating zones, wherein the first communications interface is configured to communicate over a first maximum distance; and a second communications interface configured to send and receive communications for an authorization with the multimedia device via a second radio link, wherein the second communications interface is configured to communicate over a second maximum distance, wherein the authorization remains valid for a limited length of time even in the absence of a signal transmitted via the second radio link, wherein the first maximum distance is greater than the second maximum distance, wherein the authorization remains valid for the limited length of time even if the multimedia device is outside of the second maximum distance and within the first maximum distance, whereby, when the multimedia device is more than the second maximum distance, the first communications interface receives the control command prior to the second communications interface receiving the authorization command, which is transmitted once the multimedia device is within the second maximum distance to activate the received control command.

2. The hob of claim 1, wherein the first communications interface is configured to receive the control command via a wireless network.

3. The hob of claim 2, wherein the wireless network is a wireless local area network.

4. The hob of claim 1, wherein the second maximum distance is 30 centimeters.

5. The hob of claim 1, wherein the second maximum distance is 15 centimeters.

6. The hob of claim 1, wherein the second communication interface sends and receives an authorization communication with the multimedia device prior to transmitting the control command or prior to an implementation of the control command in the hob.

7. The hob of claim 1, wherein the length of time is less than 5 minutes.

8. A method for controlling a hob, comprising:

transmitting a control command to the hob via a first radio link using a multimedia device, wherein the control command is operable to adjust one or more heating zones, wherein a first communications interface is configured to communicate over a first maximum distance; and requesting an authorization, from the multimedia device, via a second radio link between the multimedia device and the hob, wherein a second communications interface is configured to communicate over a second maximum distance; and obtaining the authorization prior to an implementation of the control command in the hob, wherein the authorization remains valid for a limited length of time even in the absence of a signal transmitted via the second radio link, wherein the first maximum distance is greater than the second maximum distance, wherein the authorization remains valid for the limited length of time even if the multimedia device is outside of the second maximum distance and within the first maximum distance, whereby, when the multimedia device is more than the second maximum distance, the first communication interface receives the control command prior to the second communication interface receiving the authorization command, which is transmitted once the multimedia device is within the second maximum distance to activate the received control command.

9. The method of claim 8, wherein the length of time is limited to a value of less than 5 minutes.

10. The method of claim 8, wherein the length of time is limited to a value of less than 3 minutes.

11. The method of claim 8, further comprising storing the control command in the hob until the authorization is obtained.

12. The method of claim 11, further comprising deleting the control command in the hob in the absence of a transmission of the authorization via the second radio link.

13. The method of claim 8, wherein the second radio link is a near field communication (NFC) radio link via which data is exchanged to grant the authorization.

14. The method of claim 13, wherein the NFC radio link is based on active radio frequency identification technology.

15. The method of claim 13, wherein the NFC radio link operates in a frequency range of 13.5 MHz.

16. The method of 8, wherein the control command is generated on the multimedia device indirectly by a user of the hob by selecting a dish to be cooked.

17. A hob, comprising:

one or more heating zones;

a first communications interface communicatively couplable with a multimedia device via a first radio link, wherein the first communications interface is configured to communicate over a first maximum distance;

a second communications interface communicatively couplable with the multimedia device via a second radio link, wherein the second communications interface is configured to communicate over a second maximum distance;

wherein the first communications interface is operable to receive a control command via the first radio link and the second communications interface is operable to obtain an authorization from the multimedia device prior to an implementation of the control command via the first radio link;

wherein the control command is operable to adjust the one or more heating zones and the authorization remains valid for a limited length of time even in the absence of a signal transmitted via the second radio link, wherein the first maximum distance is greater than the second maximum distance, wherein the authorization remains valid for the limited length of time even if the multimedia device is outside of the second maximum distance and within the first maximum distance, whereby, when the multimedia device is more than the second maximum distance, the first communication interface receives the control command prior to the second communication interface receiving the authorization command, which is transmitted once the multimedia device is within the second maximum distance to activate the received control command.

18. The hob of claim 17, the second maximum distance is thirty centimeters.

* * * * *